United States Patent [19]
Wilkinson

[11] Patent Number: 4,986,022
[45] Date of Patent: Jan. 22, 1991

[54] DEVICE FOR RETRIEVING FISHING EQUIPMENT

[76] Inventor: James D. Wilkinson, R.R. 5, Box 183, Muncie, Ind. 47302

[21] Appl. No.: 489,513

[22] Filed: Mar. 7, 1990

[51] Int. Cl.$^5$ ............................................. A01K 97/00
[52] U.S. Cl. ..................................................... 43/17.2
[58] Field of Search ................................ 43/17.2, 44.9

[56] References Cited

U.S. PATENT DOCUMENTS

| | | | |
|---|---|---|---|
| 1,243,768 | 10/1917 | Scott | 43/44.9 |
| 2,627,691 | 2/1955 | Bress | |
| 2,827,730 | 3/1958 | Hunt | 43/17.2 |
| 2,887,814 | 5/1959 | Chambers | |
| 3,224,132 | 12/1965 | Frantz | |
| 4,598,493 | 7/1986 | O'Brien | |
| 4,756,112 | 7/1988 | Sprague | |

FOREIGN PATENT DOCUMENTS 699302 12/1964 Canada .
805484 5/1936 France .
932336 3/1948 France .

*Primary Examiner*—Kurt Rowan
*Assistant Examiner*—James Miner
*Attorney, Agent, or Firm*—Terry M. Gernstein

[57] ABSTRACT

A device for retrieving fishing equipment, such as a hook, which is snagged includes a monolithic body having a forward end portion and a rear end portion which are in the shape of tangent ogives. A central bore is defined through the body for accommodating a fishing line on which the device will ride, and a slot intersects the bore to permit that fishing line to move into the bore. Slotted lock rings are positioned in grooves to lock the device to the fishing line. The lock rings are sloped so that a smooth, uninterrupted curve is formed from the forwardmost end of the device to the rearmost end of the device even when the lock rings are in place in the grooves so that no discontinuities are formed which may tend to cause drag on the device as it moves through the water toward the snagged equipment.

4 Claims, 2 Drawing Sheets

DEVICE FOR RETRIEVING FISHING EQUIPMENT

Technical Field of the Invention

The present invention relates to the general art of amusement devices, and to the particular field of fishing equipment.

Background of the Invention

Fishing lures seldom wear out. They are most commonly lost when they accidentally become snagged on a submerged rock or tree stump. Although the lure body may become wedged in the obstruction, it is more likely that the fishing hooks attached to the body will penetrate or become caught in the obstruction in such a case, if the fishing line is strong enough the fisherman operating the lure can retrieve it simply by pulling on the fishing line until the hook bends and the lure is freed. Fishing line typically used today by sports fisherman, even deep sea fisherman, is far too low in tensile strength to bend the hooks sufficiently to permit such operation to free the snagged hook.

Thus, the fisherman is required to use a jiggling operation to free a snagged hook. In such an operation the fisherman tries to gently jiggle the fishing line and pull on the line in various directions to free the snagged hook. If this is not successful, the fisherman must cut the line and abandon the hook, line and sinker.

In such a case the fisherman is required to obtain an alternate lure from his tackle box, replace the leader and/or other attachment device employed between the line and the lure, and, if he desires to replace the lost lure, must make a special trip to a fishing store for replacement thereof. Thus, not only must the fisherman frequently purchase a new lure, he is also put to considerable inconvenience when the fishing line breaks and the lure is lost. If the fisherman had used the same lure for many years, he may feel compelled to re-purchase the same lure style or design. It is possible, however, that such a style or design is no longer readily available. Thus, the fisherman may be seriously inconvenienced in searching for a substitute or may never find a desirable substitute.

For this reason, the art has contained several proposals for devices that are used to free a snagged hook. However, due to several drawbacks, these devices have not been entirely commercially successful.

For example, present devices often do not obtain sufficient momentum to dislodge a snagged hook. These devices often have a body shape that actually interferes with the movement of the device through the water by offering resistance to the flow of water about the body. Furthermore due to the shape of the bodies of many presently available retrievers, the retriever runs into the branch or other element on which the hook is snagged or runs into material located adjacent to such branch before it contacts the hook and thus any momentum that it does have is further degraded.

Therefore, there is a need for a fishing equipment retriever which does not lose a significant amount of its momentum as it moves through the water towards a snagged hook, and is shaped to by-pass the element on which the hook is snagged to strike the hook with a maximum amount of momentum

Objects of the Invention

It is a main object of the present invention is to provide a fishing equipment retriever which does not lose a significant amount of its momentum as it moves through the water towards a snagged hook.

It is another object of the present invention to provide a fishing equipment retriever which does not lose a significant amount of its momentum as it moves through the water towards a snagged hook, and does not contact the element on which the hook is snagged before striking the hook so that the momentum of the retriever is not unduly degraded by such contact prior to the retriever striking the snagged hook.

Summary of the Invention

These, and other, objects are achieved by a fishing equipment retriever that is of the type intended to move down a fishing line and impact a snagged hook, and which is designed to offer the least amount of resistance to the water as it moves through the water, and which is shaped to by-pass branches and like elements on which a hook is likely to become snagged.

Specifically, the retriever has a body with ends that are shaped in the form of tangent ogives. An "ogive" is a body of revolution whose contour is the arc of a circle. An ogive whose center of arc is in the plane in the base of the end is a "tangent ogive". A tangent ogive end will not create any break in contour when attached to a cylindrical body. However, the body of the device embodying the present invention is preferably curved to further limit the amount of resistance to movement through water. Tangent ogives are discussed in textbooks on aerodynamics of rocket flight, such as "Aerodynamics Propulsion Structures and Design Practice" by E. Arthur Bonney, M.J. Zucrow and C.W. Besserer and published in 1956 by D. Van Nostrand Company, Inc, the disclosure of which is incorporated herein by reference.

The streamlined shape of the retriever body thus permits it to have the maximum amount of momentum when it impacts the snagged hook, and will also permit it to move by the branch or other such element without significant degradation of its momentum. This will permit the retriever to strike the hook with the maximum impact and thus give it the greatest possible chance of dislodging a snagged hook.

Brief Description of the Drawing Figures

Detailed Description of the Preferred Embodiment of the Invention

Figure 1:
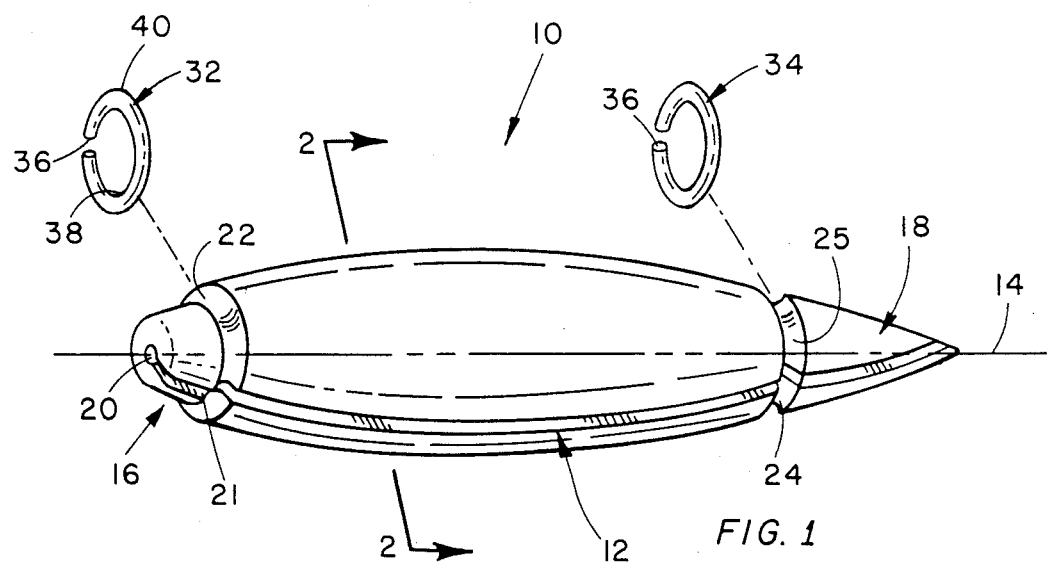
FIG. 1 is a perspective view of the preferred form of the fishing equipment retriever of the present invention with one part of the retriever removed to more clearly show the fishing line accommodating bore of the body.
Figure 2:
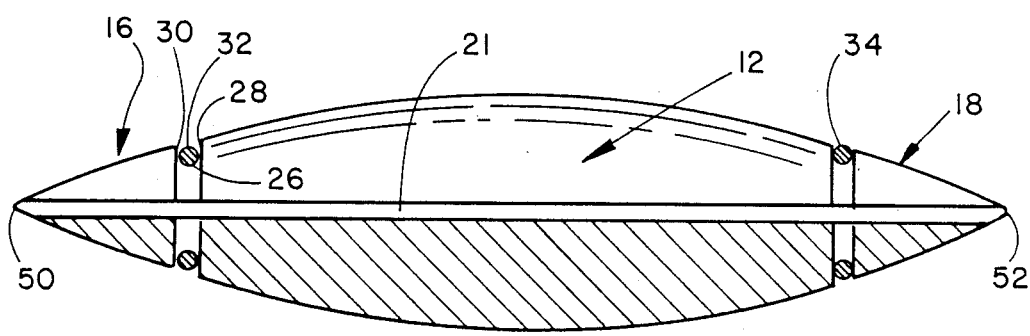
FIG. 2 is a view taken along line 2—2 of FIG. 1.

Shown in FIGS. 1 and 2 is a fishing equipment retriever 10 embodying the preferred form of the present invention.

The retriever 10 is monolithic and includes a main body 12 which is formed of heavy material, such as lead or the like, and which also includes a longitudinal centerline 14. A forward end 16 is on one end of the body and a rear end 18 is on the opposite end of the body. The forward end 16 is cut off in FIG. 1 for the purpose of better showing the interior of the body.

Figure 3:
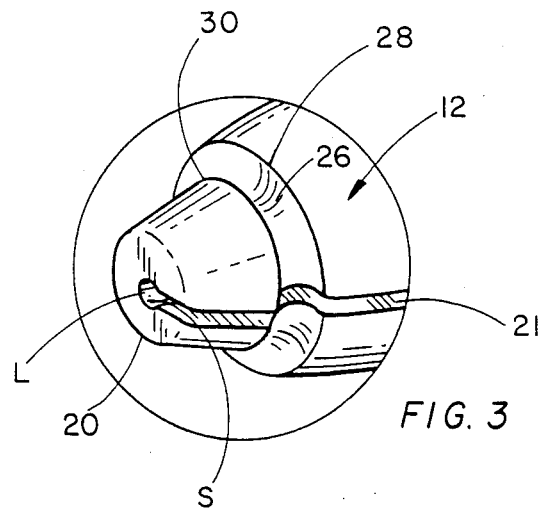
FIG. 3 is a detail view showing the fishing line accommodating bore and lock ring groove, with the tangent ogive shaped body being removed to more clearly show this bore and groove.

A bore 20 extends along the longitudinal centerline completely through the body from end 16 to end 18, and is sized to permit a fishing line to pass through the body with ease, and to permit the retriever 10 to slide over fishing equipment associated with a snagged hook A friction reducing material, such as TEFLON or the like can be used as a liner for the bore 20 to further improve the movement of the device along the fishing line. Such an anti-friction liner is indicated in FIG. 3 as liner L. A slot 21 extends for the entire length of the body and intersects the bore 20 for permitting a fishing line to be positioned in the bore for the purpose of attaching the retriever to the fishing line. The anti-friction liner is shaped to correspond to the complete shape of the bore 20 and the slot 21 and has a slot S defined therein through with the fishing line passes.

The main body 12 of the retriever connects the ends 16 and 18 together and a forward groove 22 is defined in the retriever at the intersection of the forward end 16 and the body and a rear groove 24 is defined in the body adjacent to the rear end 18. The main body is curved, and the ends are tangent ogives and are sized to form a smooth continuation of such main body curve. The tangent ogive shape of the ends refers to the peripheral shape of the end element, and such end elements are conical in nature, with a base, such as base 25 of end 18. The base of each end element is spaced from the base of the main body by the groove.

Each of the grooves has a bottom, such as bottom 26 of groove 22 and a maximum outer diameter located at the intersection of the groove and the arcuate body, such as indicated in FIG. 2 at location 28 of the forward groove, and a minimum outer diameter at the intersection of the groove and the associated end, such as at location 30 of groove 22.

The retriever 10 further includes two lock rings for releasably attaching the retriever to a fishing line. The lock rings are annular and include a forward lock ring 32 that fits into forward groove 22 and a rear lock ring 34 that fits into the rear groove 24. The preferred form of the lock rings is copper, but elastomeric material or plastic material can also be used. Each of the rings has a slot 36 defined therethrough between an inner portion 38 having an inner diameter and an outer portion 40 having an outer diameter. The slot has a width that matches the width of the slot 21. The inner diameter of each of the rings matches the diameter of the groove at the bottom 26 thereof so that the rings must be pulled apart thus widening the slots 36, to place them on the body in the grooves. The rings are naturally resilient, and thus tend to snap back into position after being deformed so that the rings can be snapped onto the body in the grooves.

The slots on the rings are aligned with the slot 21 to define a continuous slot through which fishing line is moved to position that fishing line in the bore 20. Once the fishing line is positioned in the bore 20, the rings 32 and 34 are moved to move the ring slots 36 out of alignment with the body slot 21 thereby locking the fishing line in the bore 21.

Figure 4:
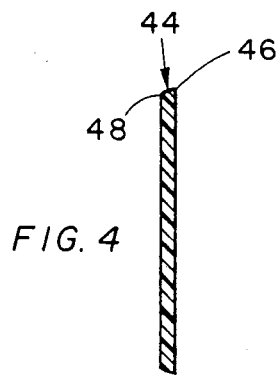
FIG. 4 is an elevational view of a lock ring, showing that the ring is curved in two planes on its outer perimeter.

As best shown in FIG. 4, each of the lock rings includes an outer surface 44 that is curved in two planes. A first curved portion 46 forms a rear portion of the ring, and a second curved portion 48 forms a front portion of the ring. The rear portion of the ring is positioned adjacent to the main body, and the front portion of the ring is adjacent to the end element when the ring is positioned in the groove. The rear portion curvature is greater than the forward portion curvature. The ring thus slopes from the rear portion towards the front portion, and this slope matches the curvature of the body and the end surfaces so that a smooth, continuous curved surface is established when the rings are in the grooves. Essentially no discontinuities are formed in this smooth curve from the frontmost tip 50 of the forward end element 16 to the rearmost tip 52 of the rear end element 18. The smooth, uninterrupted surface established by the co-operation of these elements prevents the formation of discontinuities that tend to form drag surfaces on the retriever 10 as it moves through water towards the snagged hook. The ring shown in FIG. 4 is cross-sectioned as being an elastomeric element for the sake of a complete disclosure; however the ring is preferably formed of copper.

Figure 5:
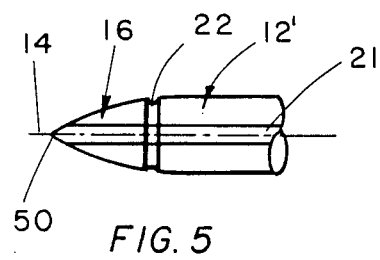
FIG. 5 is shows an alternative form of the retriever in which the curved body of the preferred form is replaced by a cylindrical body.

While the preferred form of the main body is arcuate as discussed above, the main body can also be cylindrical in shape as shown in FIG. 5. The elements discussed above are all the same, with the FIG. 5 embodiment with the sole exception being the cylindrical form of the main body 12'.

It is understood that while certain forms of the present invention have been illustrated and described herein, it is not to be limited to the specific forms or arrangements of parts described and shown.

I claim:

1. A fishing equipment retriever comprising:
A) a monolithic body formed of heavy metal and which includes
  (1) a forward end portion,
  (2) a rear end portion,
  (3) a body connecting said forward end portion to said rear end portion, said body having an outer periphery which is curved,
  (4) said forward end portion and said rear end portion each having an outer peripheral shape of a tangent ogive and forming a smooth continuation of the curved outer periphery of said monolithic body,
  (5) a longitudinal axis extending from said forard end portion to said rear end portion,
  (6) a bore extending along said longitudinal axis,
  (7) a slot defined through said body and through said end portions and intersecting said bore,
  (8) a forward groove defined in said body adjacent to said forward end portion and having a maximum outer diameter located adjacent to said body and a minimum outer diameter located adjacent to said forward end portion and an inner diameter located between said minimum outer diameter and said maximum outer diameter,
  (9) a rear groove defined in said body adjacent to said rear end portion and having a maximum outer diameter located adjacent to said body and a minimum outer diameter located adjacent to said rear end portion and an inner diameter located between said minimum outer diameter and said maximum;

B) a forward annular lock ring located in said forward groove, said forward lock ring including
  (1) a slot defined therethrough
  (2) an inner surface having a diameter essentially equal to said forward groove inner diameter,
  (3) an outer surface which is curved in two planes to have
    (a) a rear portion located adjacent to said body when said forward lock ring is in said forward groove, said forward lock ring rear portion having a first radius of curvature, and
    (b) a forward portion located adjacent to said forward end portion when said forward lock ring is in said forward groove, said forward lock ring forward portion having a second radius of curvature that is different from said forward lock ring outer surface first radius of curvature so that said forward lock ring outer surface slopes from said forward lock ring forward portion towards said forward lock ring rear portion and forms a curve that matches the smooth curvature of the outer periphery of said monolithic body when said forward lock ring is in said forward groove; and C) a rear annular lock ring located in said rear groove, said rear lock ring including
  (1) a slot defined therethrough,
  (2) an inner surface having a diameter essentially equal to said rear groove inner diameter,
  (3) an outer surface which is curved in two planes to have
    (a) a forward portion located adjacent to said body when said rear lock ring is in said rear groove, said rear lock ring outer surface forward portion having a first radius of curvature, and
    (b) a rear portion located adjacent to said rear end portion when said rear lock ring is located in said rear groove, said rear lock ring outer surface rear portion having a second radius of curvature that is different from said rear lock ring outer surface first radius of curvature so that said rear lock ring outer surface slopes from said rear lock ring rear portion towards said rear lock ring front portion and forms a curve that matches the smooth curvature of the outer periphery of said monolithic body when said rear lock ring is in said rear groove;

D) said smooth curvature being essentially uninterrupted from a forwardmost location on said forward end portion to a rearwardmost location on said rear end portion.

2. The fishing equipment retriever defined in claim 1 wherein said heavy metal is lead.

3. The fishing equipment retriever defined in claim 2 wherein said lock rings are both formed of copper.

4. The fishing equipment retriever defined in claim 3 further including an anti-friction liner located in said bore and in said slot.

* * * * *